(12) United States Patent
Jung et al.

(10) Patent No.: US 10,925,374 B2
(45) Date of Patent: Feb. 23, 2021

(54) COSMETIC PRODUCT FURTHER HAVING IMPREGNATION MEMBER WITH OUTER SURFACE THEREOF MOLTEN

(71) Applicant: AMOREPACIFIC CORPORATION, Seoul (KR)

(72) Inventors: Hae Won Jung, Seoul (KR); Sang Young Jung, Seoul (KR)

(73) Assignee: AMOREPACIFIC CORPORATION, Seoul (KR)

( * ) Notice: Subject to any disclaimer, the term of this patent is extended or adjusted under 35 U.S.C. 154(b) by 267 days.

(21) Appl. No.: 16/095,297

(22) PCT Filed: Apr. 19, 2017

(86) PCT No.: PCT/KR2017/004207
§ 371 (c)(1),
(2) Date: Oct. 19, 2018

(87) PCT Pub. No.: WO2017/183913
PCT Pub. Date: Oct. 26, 2017

(65) Prior Publication Data
US 2019/0133294 A1 May 9, 2019

(30) Foreign Application Priority Data

Apr. 22, 2016 (KR) ........................ 10-2016-0049479

(51) Int. Cl.
*A45D 33/34* (2006.01)
*B29C 51/00* (2006.01)
(Continued)

(52) U.S. Cl.
CPC ............. *A45D 33/34* (2013.01); *A45D 33/02* (2013.01); *A45D 33/24* (2013.01); *A45D 40/18* (2013.01);
(Continued)

(58) Field of Classification Search
CPC ........ A45D 40/00; A45D 40/18; A45D 40/22; A45D 33/34; A45D 33/24; A45D 33/003;
(Continued)

(56) References Cited

U.S. PATENT DOCUMENTS

| 4,706,693 A | * | 11/1987 | Spector ................. A45D 40/26 |
| | | | 132/320 |
| D427,724 S | * | 7/2000 | Longo .............................. D28/4 |
| 10,206,480 B2 | * | 2/2019 | Kim ...................... A45D 33/006 |
| 10,244,846 B2 | * | 4/2019 | Kim ........................ A45D 34/04 |

(Continued)

FOREIGN PATENT DOCUMENTS

| JP | H0232718 U | * | 8/1988 | ............. A45D 33/34 |
| JP | 09164017 A | * | 6/1997 | |

(Continued)

*Primary Examiner* — Nicholas D Lucchesi
(74) *Attorney, Agent, or Firm* — Heedong Chae; Lucem, PC

(57) ABSTRACT

The present invention relates to a cosmetic product having an impregnation member with the outer surface thereof molten, in which a first impregnation member is embossed and engraved on the top surface thereof by compressing the first impregnation member onto a heated, embossed and engraved metal mold and then melting the first impregnation member, and an open cell structure of the top surface of the first impregnation member is molten to be transformed into an open cell structure having a size of ½ or less. As such, when a user presses cosmetic contents with a puff for use, the impregnation member prevents the excessive smearing and waste of the cosmetic contents on the puff, and the cosmetic contents can be uniformly and thinly smeared on the puff, and a second impregnation member, which is coupled to the lower surface of the first impregnation member, maintains an open cell structure.

13 Claims, 9 Drawing Sheets

(51) Int. Cl.
    *B29C 51/42*     (2006.01)
    *B29C 51/26*     (2006.01)
    *B65D 77/04*     (2006.01)
    *B65D 43/16*     (2006.01)
    *B65D 47/06*     (2006.01)
    *A45D 33/02*     (2006.01)
    *A45D 33/24*     (2006.01)
    *A45D 40/18*     (2006.01)
    *A45D 40/22*     (2006.01)

(52) U.S. Cl.
    CPC .............. *A45D 40/22* (2013.01); *B29C 51/00* (2013.01); *B29C 51/26* (2013.01); *B29C 51/42* (2013.01); *B65D 43/16* (2013.01); *B65D 47/06* (2013.01); *B65D 77/04* (2013.01)

(58) Field of Classification Search
    CPC .......... A45D 33/006; A61K 8/02; A61K 8/87; A61K 8/022; A61K 8/0208
    See application file for complete search history.

(56) References Cited

U.S. PATENT DOCUMENTS

| | | | | |
|---|---|---|---|---|
| 2005/0118213 | A1* | 6/2005 | Ancorotti | A61Q 1/10 424/401 |
| 2012/0180808 | A1* | 7/2012 | Nakamura | A45D 33/006 132/320 |
| 2013/0213431 | A1* | 8/2013 | Geva | B29C 45/14819 132/320 |
| 2014/0023689 | A1* | 1/2014 | Kim | C08L 75/08 424/401 |
| 2016/0157585 | A1* | 6/2016 | Kang | A45D 40/0068 220/259.2 |

FOREIGN PATENT DOCUMENTS

| KR | 10-2014-0059398 A | 5/2014 |
|---|---|---|
| KR | 10-1566803 B1 | 11/2015 |
| KR | 10-1481545 B1 | 1/2016 |
| KR | 10-2016-0011512 A | 2/2016 |
| KR | 10-2016-0037140 A | 4/2016 |

* cited by examiner

COSMETIC PRODUCT FURTHER HAVING IMPREGNATION MEMBER WITH OUTER SURFACE THEREOF MOLTEN

CROSS-REFERENCE TO RELATED APPLICATIONS

This application is based on and claims the benefit of priority to Korean Patent Application No. 10-2016-49479 filed on Apr. 22, 2016, with the Korean Intellectual Property Office, the disclosure of which is incorporated herein by reference.

TECHNICAL FIELD

The present invention relates to a cosmetic having an impregnation member with a melted outside, and more particularly, to a cosmetic having an impregnation member with a melted outside, where an open cell structure of an upper surface of a first impregnation member is pressed and melted with a heated metal mold in which a convex and concave part is formed, so that the open cell structure is modified to have a size of a half or less. When the impregnating member is stuck with a puff to use the cosmetic material, the cosmetic material may be prevented from being excessively stuck and wasted and it is possible to effectively use cosmetics by evenly sticking cosmetics on a puff. In addition, the open cell structure of a second impregnation member coupled to a lower surface of the first impregnation member is maintained as it is, so that the cosmetic material is easily impregnated.

BACKGROUND ART

Cosmetics refer to goods which are used for a human body in order to add charming of the human body and change the appearance of the human body to be brighter, or to maintain or enhance skin or hair in a healthy state by making the human body clean and beautiful, and have a minor effect on the human body.

In general, cosmetics are manufactured by mixing mutually different materials using an emulsifying agent such as a surface active agent, and the cosmetic materials may be classified into water-in-oil (W/O) emulsion type cosmetic material and oil-in-water (O/W) emulsion type cosmetic material according to the bonding structure between water-based material and oil-based material.

The water-in-oil emulsion type cosmetic material, which is obtained by bonding an oil-based material to an outside of water-based material, has a larger quantity of oil so that the absorption of skin is slow and the touch feeling is heavy, but the persistence is longer than that of the oil-in-water emulsion type cosmetic material. Thus, the cosmetics requiring persistence are manufactured by using the W/O emulsion type cosmetic material to increase water resistance against sweat and water.

The cosmetics are manufactured reduce the viscosity of content in order to compensate the defects of the W/O emulsion type cosmetic material that the touch feeling is heavy and sticky. However, when the water-in-oil product having low viscosity remains for a long time in circulation, the aqueous material of internal phase and the oil materials of external phase may be separated from each other. In this case, a user shakes a container to mix the separated aqueous and oil materials with each other for use, but it is inconvenient to shake the container for use.

To solve the problems described above, as shown in FIG. 1, a product, which disclosed in Korean Registered Patent No. 10-1159877 issued to the applicant of the present application, has been developed, where an impregnation member 1 impregnated with water-in-oil contents having low viscosity is contained in a compact container.

However, according to the above-described related art, since the contents are filled in the impregnating member 1 when the cosmetics are used for the first time, even when the pressure is applied with a small force, the contents are stuck on a puff more than necessary to be wasted.

DISCLOSURE

Technical Problem

To solve the problems described above, an object of the present invention is to provide where an open cell structure of an upper surface of a first impregnation member is pressed and melted with a heated metal mold in which a convex and concave part is formed, so that the open cell structure is modified to have a size of a half or less. When the impregnating member is stuck with a puff to use the cosmetic material, the cosmetic material may be prevented from being excessively stuck and wasted and it is possible to effectively use cosmetics by evenly sticking cosmetics on a puff. In addition, the open cell structure of a second impregnation member coupled to a lower surface of the first impregnation member is maintained as it is, so that the cosmetic material is easily impregnated.

Technical Solution

According to the present invention, there is provided a cosmetic having an impregnation member with a melted outside, which includes:

an outer container (10) having an upper part opened;

an outer container lid (20) coupled to one side of the outer container (10);

an inner container (30) installed into an inside of the outer container (10);

an impregnation member (50) installed in the inner container (30) and impregnated with a cosmetic material; and an inner container lid (70) hinge-coupled to one side of the inner container (30) to be opened and closed, wherein the impregnation member (50) comprises a first impregnation member (40) and a second impregnation member (45) formed on a lower surface of the first impregnation member (40), and the first impregnation member (40) is inserted into a heated metal mold (90) formed with a concave and convex part and pressed such that an upper surface (41) of the first impregnation member (40) is melted, thereby forming a concave and convex part on the upper surface (41) of the first impregnation member (40).

The cosmetic may further include a fixing member (60) coupled to an upper end of the inner container (30) to prevent the impregnation member (50) from being released to an outside.

The first and second impregnation members (40 and 45) may be coupled to each other through an ultrasonic wave, heat or an adhesive.

The upper surface (41) of the first impregnation member (40) may be blockaded while being melted by the metal mold (90), and the blockaded upper surface (41) may be perforated by a plurality of needles.

The cosmetic concave and convex part may be formed only on an edge of the upper surface (41) of the first impregnation member (40).

The concave and convex part formed on the upper surface (41) of the first impregnation member (40) may have a convex-circle shape or a polygonal shape.

The first impregnation member (40) may include a lower surface (42) on which a compressed layer is formed by a pressure and a heat of the metal mold (90).

The first impregnation member (40) may include a side surface (43) melted by a heat of the metal mold (90).

The cosmetic may further include a discharge net (80) coupled to the fixing member (60).

The cosmetic may further include a discharge net (80) formed on an upper surface of the fixing member (60).

The cosmetic may further include a separate discharge net (80) formed inside the inner container (30).

Advantageous Effects

According to the cosmetic having an impregnation member with a melted outside of the present invention, the open cell structure of the upper surface of the first impregnation member is pressed and melted with the heated metal mold in which the convex and concave part is formed, so that the open cell structure is modified to have a size of a half or less. When the impregnating member is stuck with a puff to use the cosmetic material, the cosmetic material may be prevented from being excessively stuck and wasted and it is possible to effectively use cosmetics by evenly sticking cosmetics on a puff. In addition, the open cell structure of the second impregnation member coupled to the lower surface of the first impregnation member is maintained as it is, so that the cosmetic material is easily impregnated.

BEST MODE

Mode for Invention

Hereinafter, a cosmetic having an impregnation member with a melted outside according to an embodiment of the present invention will be described with reference to accompanying drawings.

Figure 1:
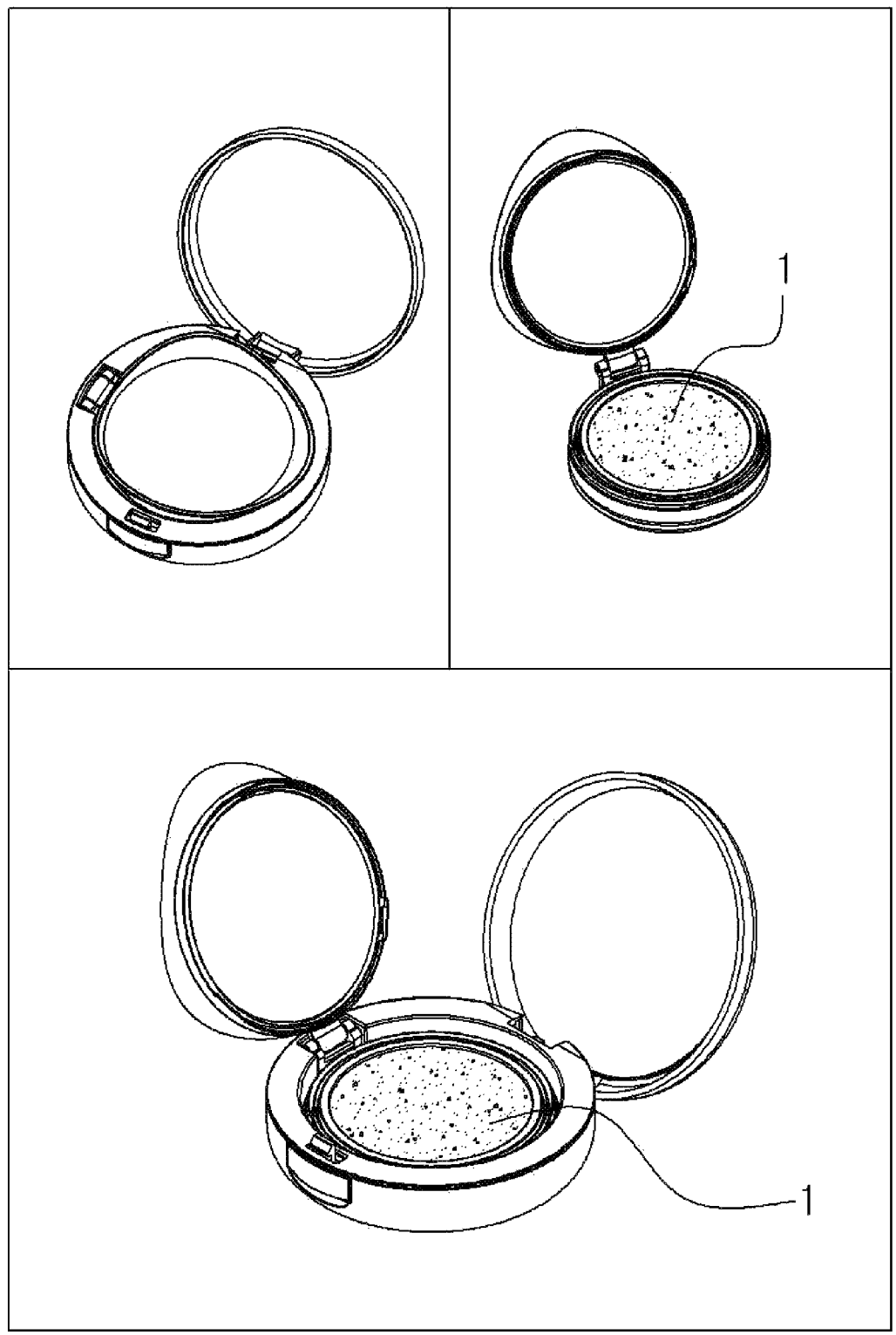
FIG. 1 is a perspective view showing a compact container according to the related art.
Figure 2:
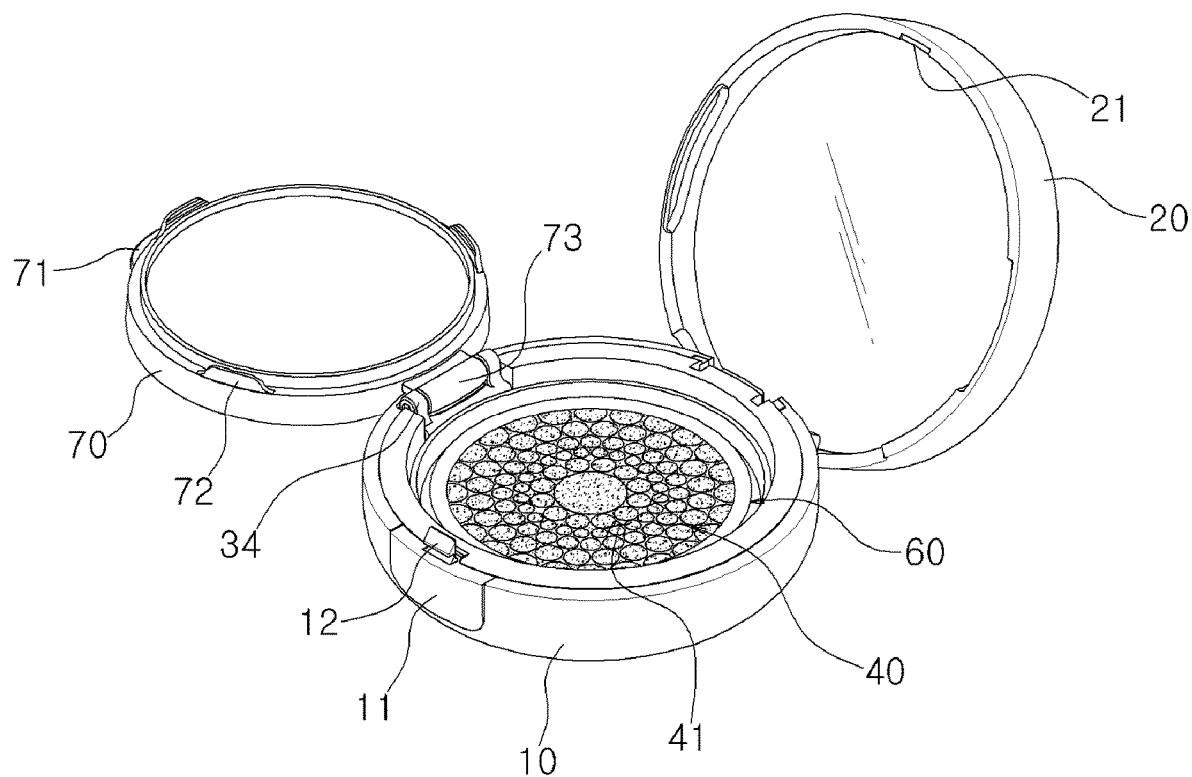
FIG. 2 is a perspective view showing a cosmetic having an impregnation member with a melted outside according to an embodiment of the present invention.
Figure 3:
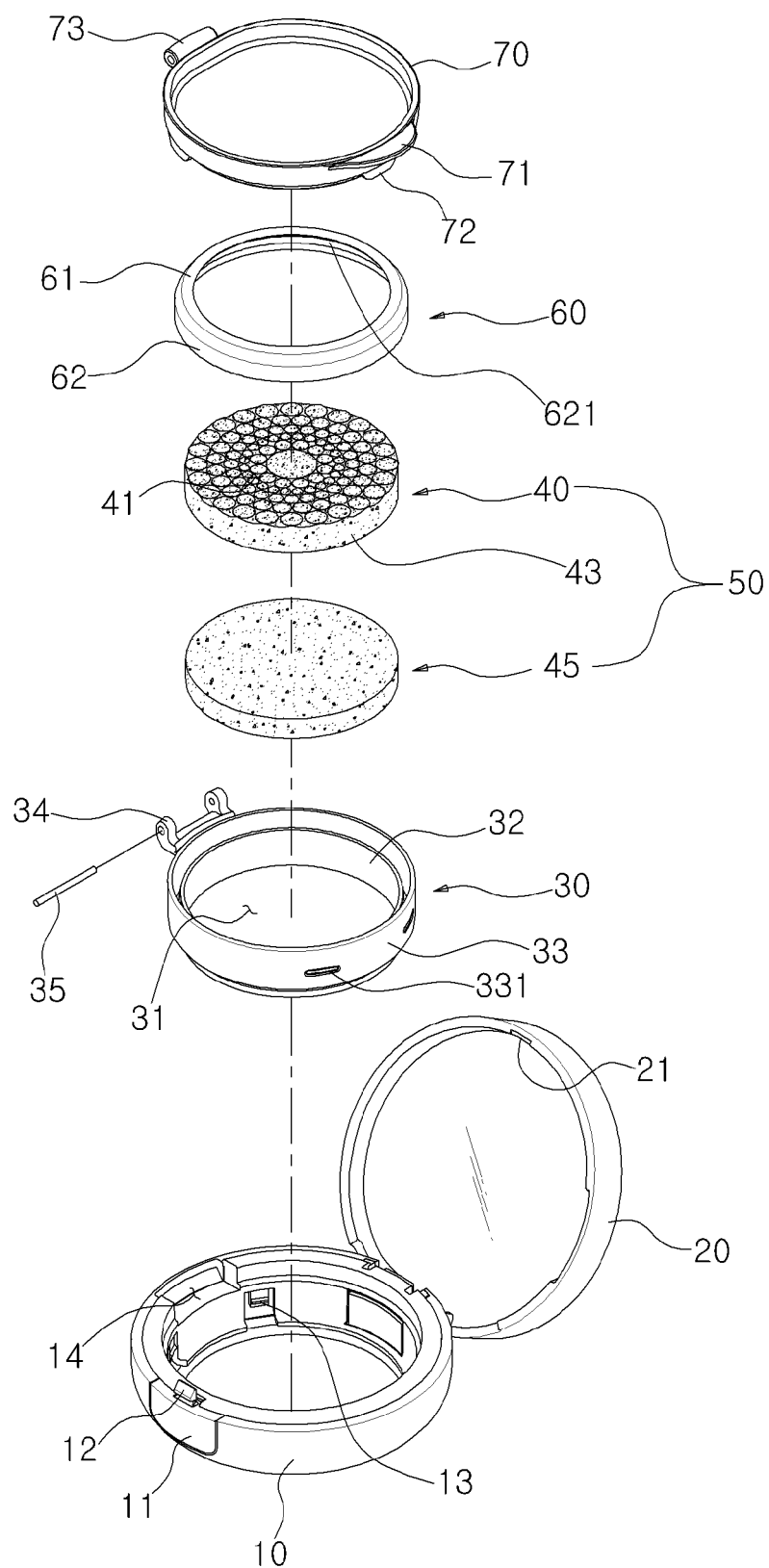
FIG. 3 is an exploded perspective view showing a cosmetic having an impregnation member with a melted outside according to an embodiment of the present invention.
Figure 4:
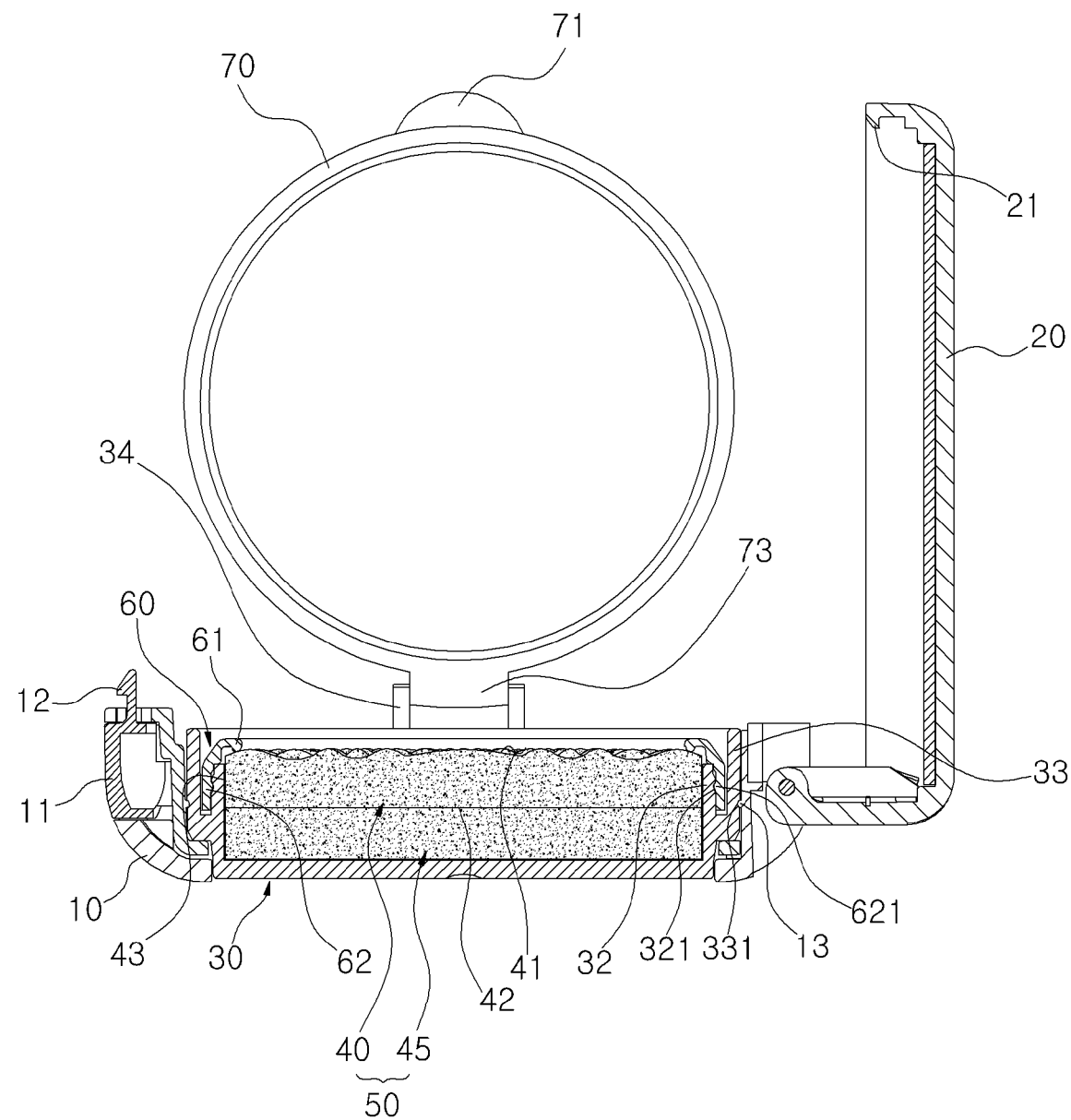
FIG. 4 is a sectional view showing a cosmetic having an impregnation member with a melted outside according to an embodiment of the present invention.
Figure 5:
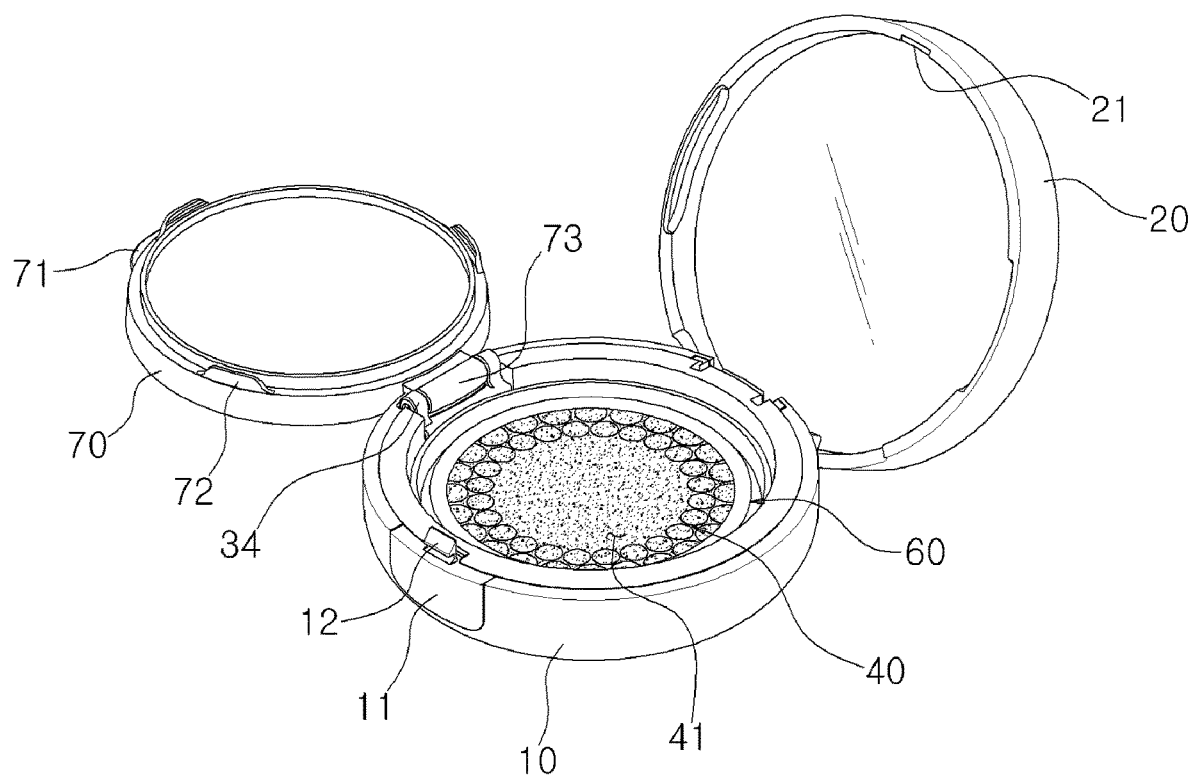
FIG. 5 is a perspective view showing a cosmetic having an impregnation member with a melted outside according to another embodiment of the present invention.
Figure 6:
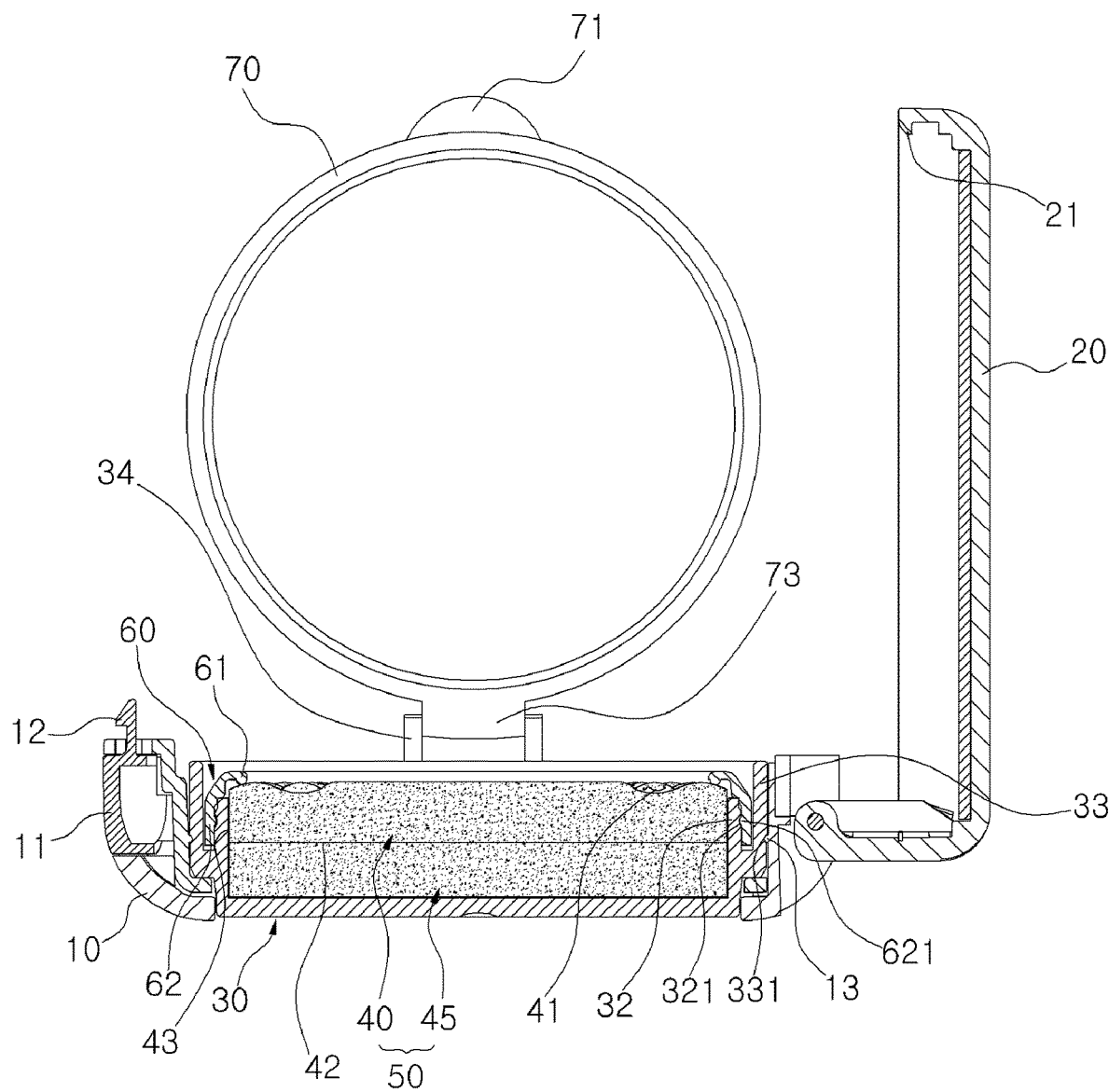
FIG. 6 is a sectional view showing a cosmetic having an impregnation member with a melted outside according to another embodiment of the present invention.
Figure 7:
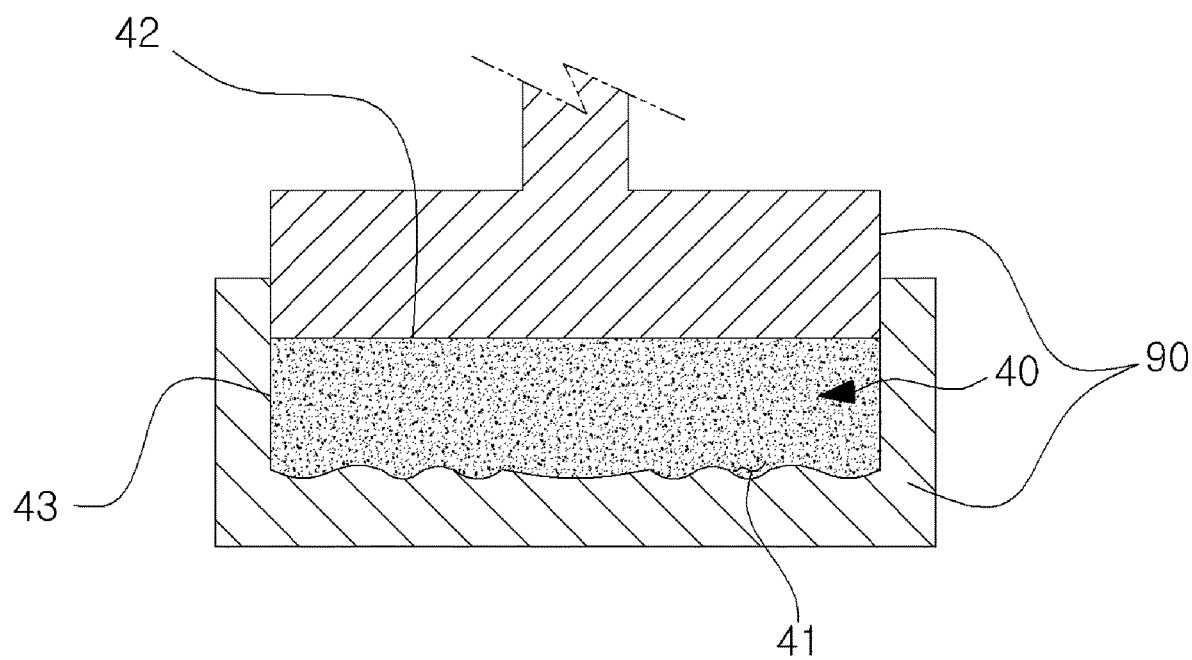
FIG. 7 is a sectional view showing a state in which a first impregnation member contained in a cosmetic having an impregnation member with a melted outside is molded according to an embodiment of the present invention.
Figure 8:
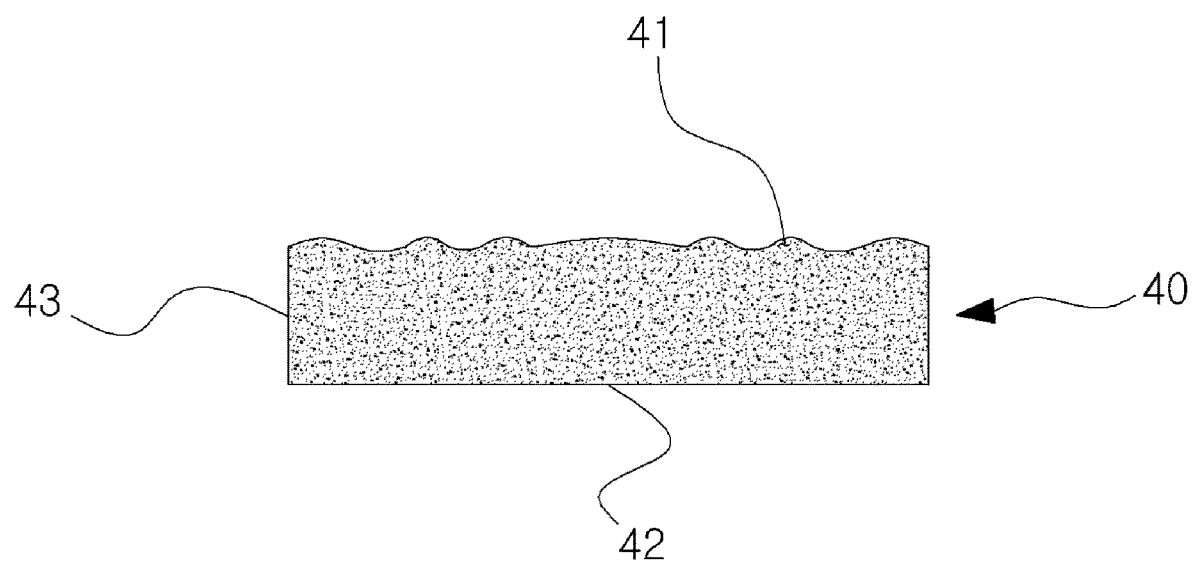
FIG. 8 is a sectional view showing a state in which a first impregnation member contained in a cosmetic having an impregnation member with a melted outside is molded according to an embodiment of the present invention.
Figure 9:
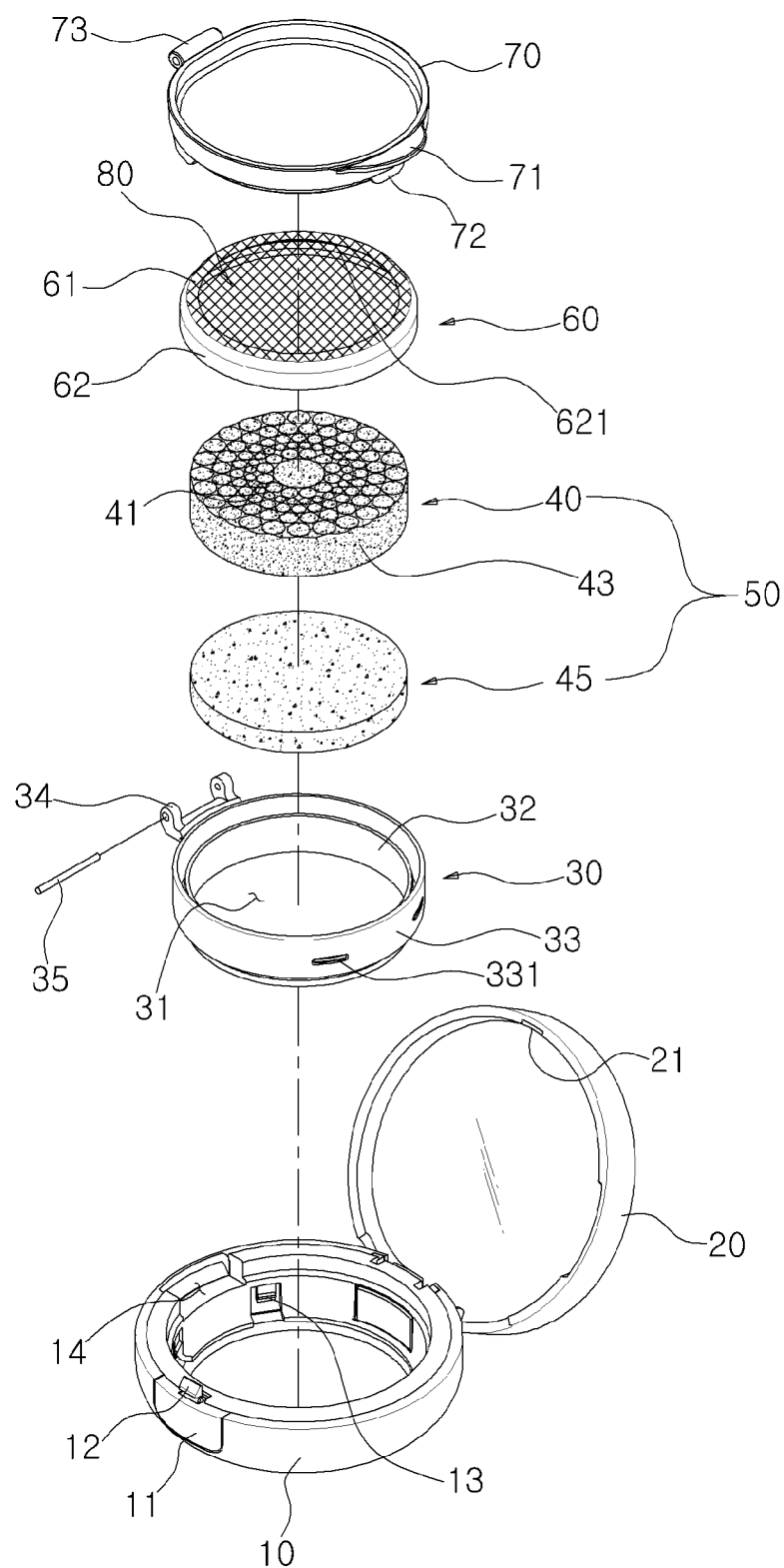
FIG. 9 is an exploded perspective view showing a cosmetic having an impregnation member with a melted outside according to still another embodiment of the present invention.

FIG. 2 is a perspective view showing a cosmetic having an impregnation member with a melted outside according to an embodiment of the present invention. FIG. 3 is an exploded perspective view showing a cosmetic having an impregnation member with a melted outside according to an embodiment of the present invention. FIG. 4 is a sectional view showing a cosmetic having an impregnation member with a melted outside according to an embodiment of the present invention. FIG. 5 is a perspective view showing a cosmetic having an impregnation member with a melted outside according to another embodiment of the present invention. FIG. 6 is a sectional view showing a cosmetic having an impregnation member with a melted outside according to another embodiment of the present invention. FIG. 7 is a sectional view showing a state in which a first impregnation member contained in a cosmetic having an impregnation member with a melted outside is molded according to an embodiment of the present invention. FIG. 8 is a sectional view showing a state in which a first impregnation member contained in a cosmetic having an impregnation member with a melted outside is molded according to an embodiment of the present invention. FIG. 9 is an exploded perspective view showing a cosmetic having an impregnation member with a melted outside according to still another embodiment of the present invention.

According to the present invention, there is provided a cosmetic having an impregnation member with a melted outside. A first impregnation member 40 of the impregnation member 50 is inserted into a heated metal mold 90 formed with a concave and convex part and pressed such that an upper surface 41 of the first impregnation member 40 is melted, thereby forming a concave and convex part on the upper surface 41 of the first impregnation member 40. A second impregnation member 45 of the impregnation member 50 is formed on a lower surface of the first impregnation member 40, and the impregnation member (50) is impregnated with a cosmetic material.

The cosmetic material impregnated into the impregnation member 50 may be a gel-type foundation containing an ultraviolet screening agent.

In addition, a cosmetic having an impregnation member with a melted outside according to the present invention includes an outer container 10 having an upper part opened, an outer container lid 20 coupled to one side of the outer container 10, an inner container 30 installed into an inside of the outer container 10, an impregnation member 50 installed in the inner container 30 and impregnated with a cosmetic material, and an inner container lid 70 hinge-coupled to one side of the inner container 30 to be opened and closed, wherein the impregnation member 50 comprises a first impregnation member 40 and a second impregnation member 45 formed on a lower surface of the first impregnation member 40, and the first impregnation member 40 is inserted into a heated metal mold 90 formed with a concave and convex part and pressed such that an upper surface 41 of the first impregnation member 40 is melted, thereby forming a concave and convex part on the upper surface 41 of the first impregnation member 40.

The outer container 10 has a push button 11 provided one side surface thereof with a locking sill protrusion 12 and a hinge formed on the opposite side of the push button 11, such that the outer container 10 is hinged to the outer container lid 20. In addition, the outer container 10 includes a coupling protrusion 13 formed on an inner circumferential surface thereof, and a hinge bracket installation groove 14 formed on an inner periphery thereof.

The locking sill 12 extending from an upper portion of push button 11 is easily retracted by a pushing operation of a user, such that the push button 11 is released from a locking protrusion 21 of the outer container lid 20.

The coupling protrusion 13 is coupled to a coupling groove 331 formed on an outer circumferential surface of an outer wall 33 of the inner container 30.

A hinge bracket 34 of the inner container 30 is inserted into the hinge bracket installation groove 14.

The outer container lid 20 which covers an upper portion of the outer container 10 is hinge-coupled to the outer container 10 such that the outer container lid 20 opens or closes the outer container 10.

The locking protrusion 21 formed at one side of the outer container lid 20 has a protrusion shape corresponding to the locking sill 12 of the outer container 10.

The inner container 30 is installed inside the outer container 10. The inner container 30 includes a bottom surface 31, an inner wall 32 extending upwardly from the bottom surface 31, and an outer wall 33 formed to be spaced part from an outside of the inner wall 32 by a predetermined interval.

A coupling protrusion 321 is formed on an outer circumferential surface of the inner wall 32, and is fitted into a coupling groove 621 formed on a fixing member 60, such that the fixing member 60 is prevented from being separated from the inner container 30.

The coupling groove 331 is formed on an outer circumferential surface of the outer wall 33. The coupling groove 331 is coupled with the coupling protrusion 13 formed on the inner circumferential surface of the outer container 10, such that the inner container 30 is prevented from being separated from the outer container 10.

The hinge bracket 34 is formed on the outer circumferential surface of the outer wall 33, and a hinge block 73 formed on the inner container lid 70 is hinge coupled to the hinge bracket 34.

The impregnation member 50 impregnated with a cosmetic material is embedded in the inner container 30. The impregnation member 50 includes the first impregnation member 40 and the second impregnation member 45 formed on the lower surface of the first impregnation member 40.

The impregnated member 50 includes at least one selected from the group consisting of butadiene rubber, styrene butadiene rubber, natural rubber, wet urethane, dry urethane, polyether, polyester, polyvinyl chloride, polyethylene, ethylene vinyl acetate, latex, silicon, styrene isoprene styrene, styrene ethylene butylene styrene, polyvinyl alcohol, silicone agent elastomer, nitrile rubber, butyl rubber and neoprene.

As shown in FIG. 7, the first impregnation member 40 is melted by pressing the upper and lower surfaces 41 and 42 with a metal mold 90 which is heated and formed with a concave and convex part, such that the concave and convex part is formed on the upper surface 41 and the pressed layer is formed on the lower surface 42 as shown in FIG. 8.

An open cell structure of the upper surface 41 of the impregnation member 40, which is formed on the upper surface 41 with the concave and convex part, is melted so that the open cell structure is modified to have a size of a half or less. Thus, the cosmetic material is thinly stuck on a puff, so that it is possible to effectively use the cosmetic material.

The concave and convex part formed on the upper surface 41 of the first impregnation member 40 is formed in a convex-circle or polygonal shape.

Since the upper surface 41 of the first impregnation member 40 may be melted by heat to be partially blockaded, the blockaded upper surface 41 is pressed with a plurality of needles to be perforated, so that the cosmetic material impregnated into the first impregnation member 40 may be smoothly discharged.

In addition, as shown in FIGS. 5 and 6, the concave and convex part may be formed by melting only on an edge of the upper surface 41 of the first impregnation member 40.

As shown in FIG. 7, the compressed layer is formed on the lower surface 42 by the pressure and heat of the metal mold 90.

The compressed layer prevents the cosmetic material impregnated into the first impregnating member 40 from moving downward due to gravity.

Like the upper surface 41, a concave and convex part may be formed on the lower surface 42.

Since the upper and lower surfaces 41 and 42 of the first impregnation member 40 are melted by the heat, when the upper surface 41 is pressed, the cosmetic material impregnated into the first impregnated member 40 is discharged through the upper surface 41 to an outside.

Since the contents are not discharged through the lower surface 42, the cosmetic material is discharged only through the upper surface 41 pressed, so that the contents may be prevented from being wasted.

The side surface 43 of the first impregnation member 40 is also melted by the heat of the metal mold 90 to melt the open cell structure, so that the open cell structure is modified to have a size of a half or less. Thus, the cosmetic material impregnated into the first impregnation member 40 is not discharged to the side surface 43.

After the cosmetic material impregnated into the first impregnation member 40 is used up, if the first impregnation member 40 is strongly pressed, the second impregnation member 45 impregnated with the cosmetic material and located on the lower surface of the first impregnation member 40 is pressed.

Since the open cell structure of the second impregnation member 45 is maintained as it is, the impregnated cosmetic material may move to the first impregnation member 40.

The first and second impregnation members 40 and 45 may be coupled to each other with an ultrasonic wave, heat or an adhesive.

The fixing member 60 is coupled to the inner container 30. The fixing member 60 includes a horizontal extension piece 61 extending inward and a lower extension piece 62 extending downward from the horizontal extension piece 61

The horizontal extension piece 61 is safely placed on an upper end of the inner wall 32 of the inner container 30 to prevent the impregnation member 50 from being detached.

The lower extension piece 62 has a coupling groove 621 formed on an inner circumferential surface thereof and the coupling groove 621 is coupled to the coupling protrusion 321 formed on the outer peripheral surface of the inner wall 32 of the inner container 30, so that the fixing member 60 is prevented from being detached from the inner container 30.

In addition, as shown in FIG. 9, a discharging net 80 may be further coupled to the fixing member 60. The discharging net 80 may be separately formed on the upper surface of the fixing member 60.

The discharging net 80 may be separately formed at an inside of the inner container 30.

The discharging net 80 may more evenly discharges the cosmetic material impregnated into the impregnation member 40.

The discharging net 80 may be formed of synthetic resin, natural rubber, or metal.

An inner container lid 70 is coupled to one side of the inner container 30 to open and close the inner container 70.

A handle 71 is formed on one side of the inner container lid 70 and a sealing piece 72 is formed on a lower end of the inner container lid 70. A hinge block 73 is formed on the opposite side of the handle 71.

The handle 71 allows the inner container lid 70 to be easily opened or closed.

The sealing piece 72 is fitted inside the outer wall 33 of the inner container 30 when the inner container lid 70 is closed to the inner container 30, so that the sealing of the inner container 30 is enhanced.

The hinge block 73 is fitted into the hinge bracket 34 of the inner container 30 and is then fixed by a hinge pin 35.

A method of assembling a cosmetic having an impregnating member with a melted outside and a use state according to an embodiment of the present invention will be described in detail as follows.

The outer container lid 20 is coupled to the outer container 10 on which the push button 11 is formed in order to assemble the cosmetic having an impregnation member with a melted outside according to the present invention.

Then, the inner container lid 70 is coupled to the inner container 30.

The impregnation member 50 impregnated with a cosmetic material is installed into the inner container 30 coupled to the inner container lid 70. The impregnation member 50 includes the first impregnation member 40 having the upper surface 41 on which the concave and convex part is formed and the second impregnation member 45 formed on the lower surface of the first impregnation member 40.

The concave and convex part formed on the upper surface 41 of the first impregnation member 40 may be formed in various sizes of a convex circle or polygonal shape.

Then, after the fixing member 60 is coupled to the inner container 30 in which the impregnation member 50 is installed, the inner container 30 is coupled inside the outer container 10 to complete the assembly.

The open cell structure of the upper surface 41 of the first impregnation member 40 of the cosmetic having an impregnated member with a melt outside assembled in the above-described method is melted so that the open cell structure is modified to have a size of a half or less. When the first impregnating member 40 is stuck with a puff to use the cosmetic material, the cosmetic material may be prevented from being excessively stuck and wasted and it is possible to effectively use cosmetics by evenly sticking cosmetics on a puff. The open cell structure of the second impregnation member 45 coupled to the lower surface of the first impregnation member 40 is maintained as it is, so that the cosmetic material is easily impregnated.

The concave and convex part formed on the upper surface 41 of the first impregnation member 40 is formed in various sizes of a convex circle or a polygonal shape, so that various designs may be implemented, thereby widening the choice of consumers.

As described above, the cosmetic having an impregnation member with a melted outside described in this disclosure is an illustrative purpose only, and the present invention is not limited thereto. Thus, it should be understood that numerous other modifications and embodiments can be devised by those skilled in the art within the spirit and scope of the present invention and they will fall within the scope of the present invention.

DESCRIPTION OF REFERENCE NUMERAL

10: Outer container
11: Push button
12: Locking sill
13: Coupling protrusion
14: Hinge bracket installation groove
20: Outer container lid
21: Locking protrusion
30: Inner container
31: Bottom surface
32: Inner wall
321: Coupling protrusion
33: Outer wall
331: Coupling groove
34: Hinge bracket
35: Hinge pin
40: Impregnation member
41: Upper surface
42: Lower surface
43: Side surface
45: Second impregnation member
50: Impregnation member
60: Fixing member
61: Horizontal extension piece
62: Lower extension piece
621: Coupling groove
70: Inner container lid
71: Handle
72: Sealing piece
73: Hinge block
80: Discharge net
90: Metal mold

The invention claimed is:

1. A cosmetic having an impregnation member with a melted outside,
   wherein a first impregnation member (40) of the impregnation member (50) is inserted into a heated metal mold (90) formed with a concave and convex part and pressed such that an upper surface (41) of the first impregnation member (40) is melted, thereby forming a concave and convex part on the upper surface (41) of the first impregnation member (40), a second impregnation member (45) of the impregnation member (50) is formed on a lower surface (42) of the first impregnation member (40), and the impregnation member (50) is impregnated with a cosmetic material,
   wherein the first impregnation member (40) includes a side surface (43) melted by a heat of the metal mold (90).

2. The cosmetic of claim 1, wherein the first and second impregnation members (40 and 45) are coupled to each other through an ultrasonic wave, heat or an adhesive.

3. The cosmetic of claim 1, wherein the upper surface (41) of the first impregnation member (40) is blockaded while being melted by the metal mold (90), and the blockaded upper surface (41) is perforated by a plurality of needles.

4. The cosmetic of claim 1, wherein the concave and convex part is formed only on an edge of the upper surface (41) of the first impregnation member (40).

5. The cosmetic of claim 1, wherein the concave and convex part formed on the upper surface (41) of the first impregnation member (40) has a convex-circle shape or a polygonal shape.

6. The cosmetic of claim 1, wherein the first impregnation member (40) includes the lower surface (42) on which a compressed layer is formed by a pressure and a heat of the metal mold (90).

7. The cosmetic of claim 1, wherein an open cell structure formed on the upper surface of the first impregnation member is melted so that the open cell structure is modified to have a size of half, or less than half, of a non-melted size of the open cell structure, and the second impregnation member coupled to a lower surface of the first impregnation member is maintained with the open cell structure.

8. A cosmetic having an impregnation member with a melted outside, the cosmetic comprising:
 an inner container (30);
 an impregnation member (50) installed in the inner container (30) and impregnated with a cosmetic material; and
 an inner container lid (70) hinge-coupled to one side of the inner container (30) to be opened and closed,
 wherein the impregnation member (50) comprises a first impregnation member (40) and a second impregnation member (45) formed on a lower surface (42) of the first impregnation member (40), and
 the first impregnation member (40) is inserted into a heated metal mold (90) formed with a concave and convex part and pressed such that an upper surface (41) of the first impregnation member (40) is melted, thereby forming a concave and convex part on the upper surface (41) of the first impregnation member (40),
 wherein the first impregnation member (40) includes a side surface (43) melted by a heat of the metal mold (90).

9. The cosmetic of claim 8, wherein the inner container (30) is installed into an inside of an outer container (10) having an upper part opened, and an outer container lid (20) is coupled to one side of the outer container (10).

10. The cosmetic of claim 8, further comprising a fixing member (60) coupled to an upper end of the inner container (30) to prevent the impregnation member (50) from being released to an outside.

11. The cosmetic of claim 10, further comprising a discharge net (80) coupled to the fixing member (60).

12. The cosmetic of claim 10, further comprising a discharge net (80) formed on an upper surface of the fixing member (60).

13. The cosmetic of claim 8, further comprising a separate discharge net (80) formed inside the inner container (30).

* * * * *